(12) United States Patent
Oda et al.

(10) Patent No.: US 8,282,333 B2
(45) Date of Patent: Oct. 9, 2012

(54) WORKPIECE TRANSFER ROBOT SYSTEM

(75) Inventors: Masaru Oda, Yamanashi (JP); Toru Shirahata, Yamanashi (JP); Toshihiko Inoue, Yamanashi (JP); Takatoshi Iwayama, Yamanashi (JP); Masaaki Uematsu, Yamanashi (JP); Kentarou Ootani, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 338 days.

(21) Appl. No.: 12/571,567

(22) Filed: Oct. 1, 2009

(65) Prior Publication Data

US 2010/0092273 A1  Apr. 15, 2010

(30) Foreign Application Priority Data

Oct. 9, 2008  (JP) .................................. 2008-263125

(51) Int. Cl.
*B25J 5/00* (2006.01)

(52) U.S. Cl. ........................ 414/591; 414/751.1; 901/16

(58) Field of Classification Search .................. 414/591, 414/749.1, 751.1, 752.1, 753.1; 901/16
See application file for complete search history.

(56) References Cited

U.S. PATENT DOCUMENTS

| | | | | |
|---|---|---|---|---|
| 5,155,423 | A | * | 10/1992 | Karlen et al. ............ 318/568.11 |
| 6,702,099 | B2 | | 3/2004 | Otaguro et al. |
| 6,976,821 | B2 | * | 12/2005 | Zarske ............................ 414/680 |
| 2005/0097940 | A1 | | 5/2005 | Strasser et al. |

FOREIGN PATENT DOCUMENTS

| | | |
|---|---|---|
| EP | 1 623 773 A1 | 2/2006 |
| EP | 1 702 727 A2 | 9/2006 |
| EP | 1 623 773 B1 | 8/2007 |
| EP | 2 177 326 A2 | 4/2010 |
| GB | 2257114 | 1/1993 |
| JP | 63-251180 | 10/1988 |
| JP | 4-115885 | 4/1992 |
| JP | 4-83548 | 7/1992 |
| JP | 4-310384 | 11/1992 |

(Continued)

OTHER PUBLICATIONS

Japanese Notice of Reasons of Rejection drafted Jul. 9, 2010 issued in Japanese Application No. 2008-263125 (including a translation thereof).

(Continued)

*Primary Examiner* — Donald Underwood
(74) *Attorney, Agent, or Firm* — Drinker Biddle & Reath LLP

(57) ABSTRACT

A workpiece transfer robot system including a machine tool provided with a workpiece support section and a robot capable of transferring a workpiece relative to the workpiece support section of the machine tool. The machine tool includes a cover surrounding at least the workpiece support section. The cover includes a first side wall provided with a first opening usable for a workpiece transferring task of the robot. The robot includes a track member defining a traveling axis extending in a direction perpendicular to the first side wall of the cover of the machine tool; a slider attached to the track member and capable of traveling along the traveling axis; a first arm attached to the slider and capable of swinging about a first swing axis; a second arm attached to the first arm and capable of swinging about a second swing axis parallel to the first swing axis; and a workpiece hold section provided on the second arm and capable of accessing the workpiece support section through the first opening of the cover of the machine tool.

8 Claims, 10 Drawing Sheets

FOREIGN PATENT DOCUMENTS

| | | |
|---|---|---|
| JP | 5-16052 | 1/1993 |
| JP | 5-318249 | 12/1993 |
| JP | 6-33690 | 5/1994 |
| JP | 6-134742 | 5/1994 |
| JP | 6-190748 | 7/1994 |
| JP | 6-270090 | 9/1994 |
| JP | 6-328141 | 11/1994 |
| JP | 2003-142547 | 5/2003 |
| JP | 3865703 | 10/2006 |
| JP | 2006-528082 | 12/2006 |
| WO | 2005-009691 | 2/2005 |

OTHER PUBLICATIONS

Decision to Grant a Patent issued in Japanese Patent Application No. 2008-263125, in Japanese language only, 3 pages.

Office Action dated Mar. 22, 2011 issued in German Patent Application No. 10 2009 048 863.4-15 (including an English translation thereof).

Japanese Notice of Reasons of Rejection mailed Jul. 13, 2010 issued in Japanese Application No. 2008-263125 (including a partial translation thereof).

* cited by examiner

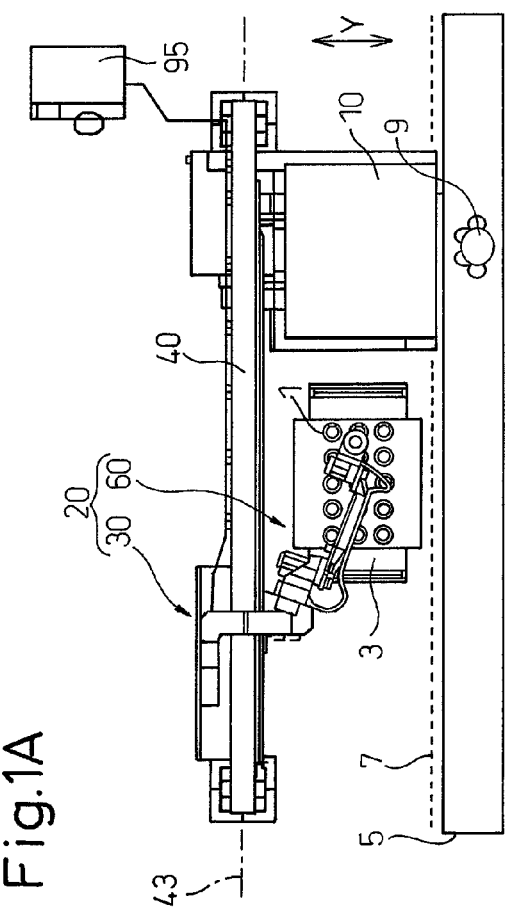
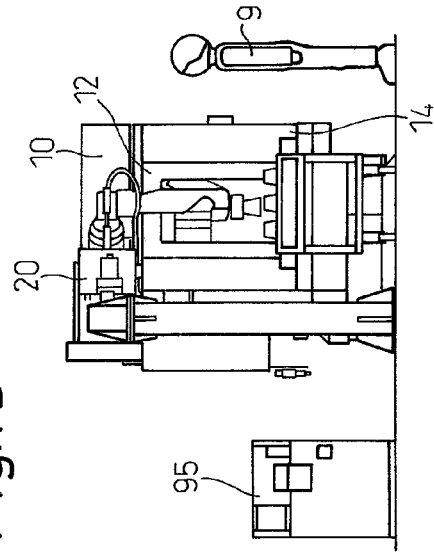
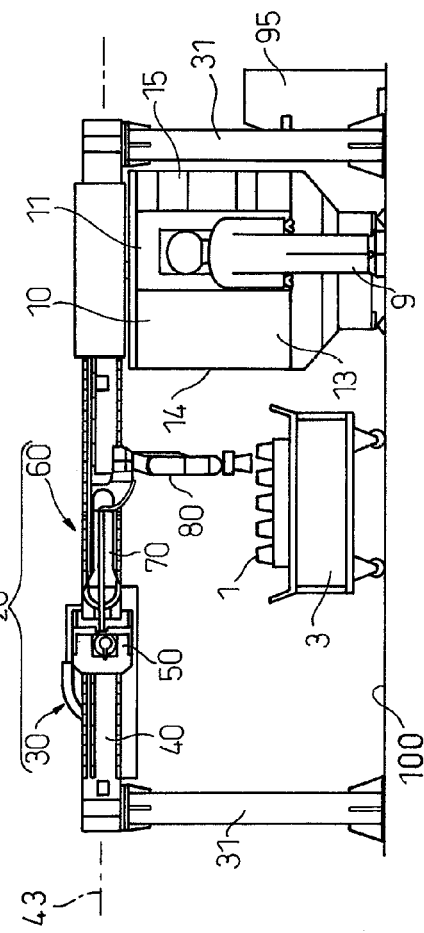

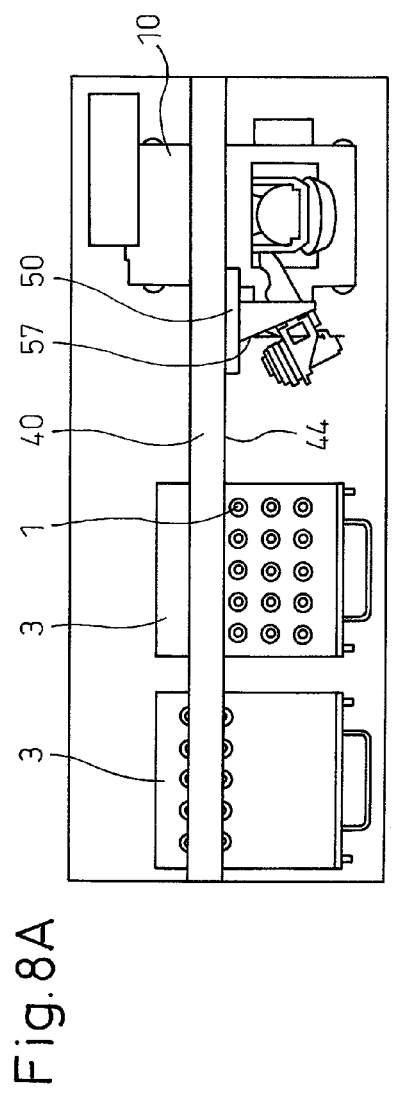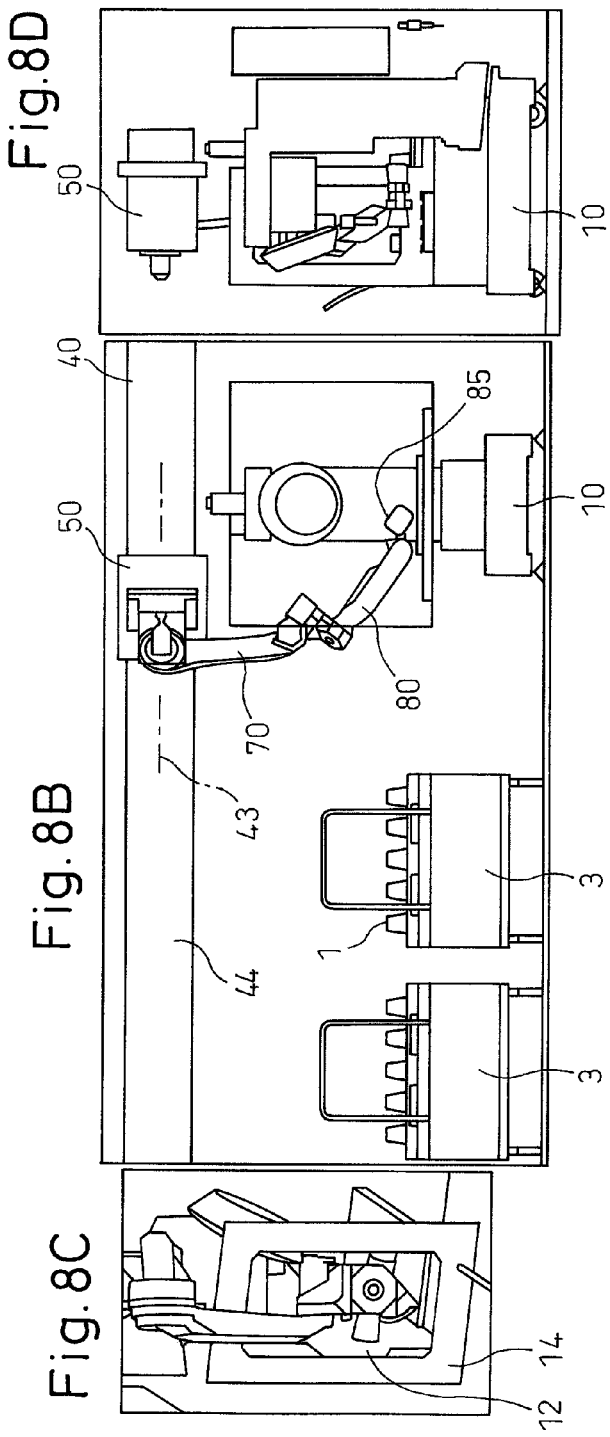

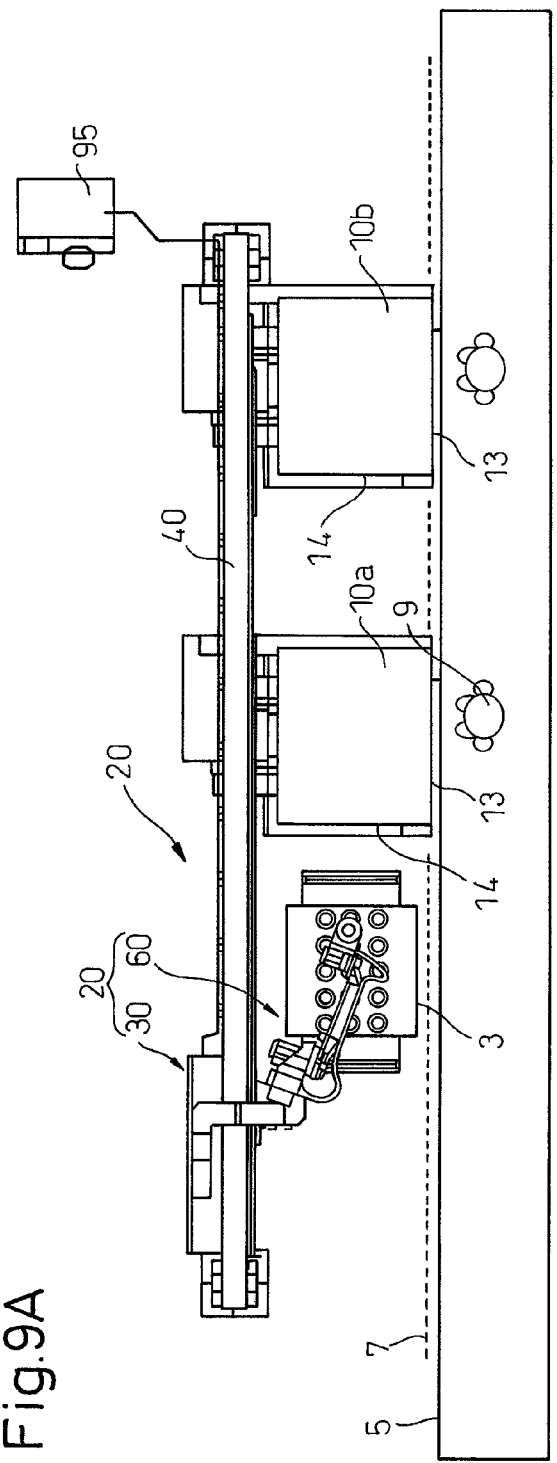

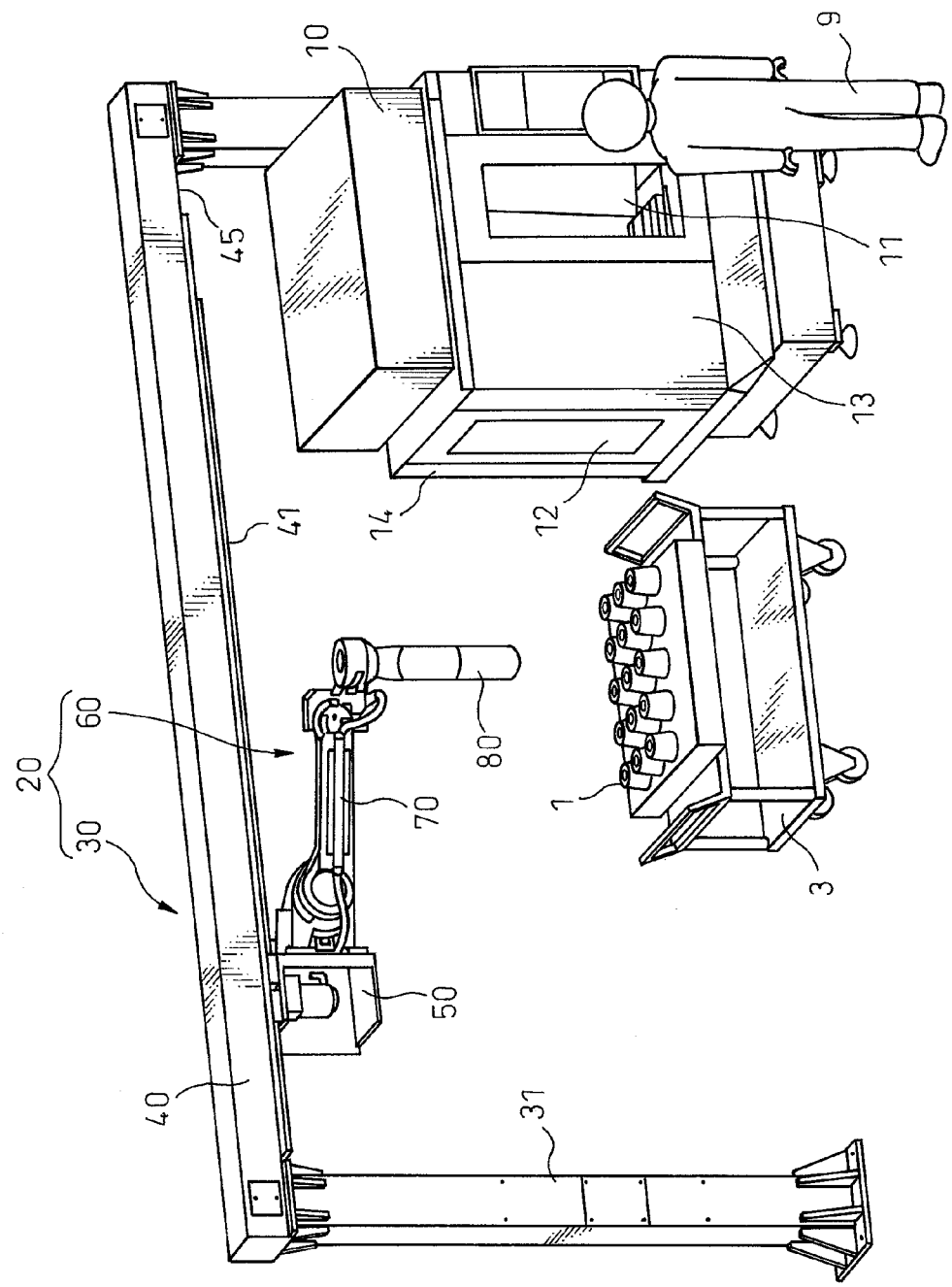

WORKPIECE TRANSFER ROBOT SYSTEM

RELATED APPLICATION DATA

This application claims priority under 35 U.S.C. §119 and/or §365 to Japanese Application No. 2008-263125, filed Oct. 9, 2008, the entire contents of which are incorporated herein by reference.

BACKGROUND OF THE INVENTION

1. Field of the Invention

The present invention relates to a workpiece transfer robot system in which a robot transfers a workpiece relative to a machine tool.

2. Description of the Related Art

A robot system for transferring, in particular, loading or unloading, a workpiece relative to a machine tool, which includes a robot composed of a traveling axis mechanism including a track member defining a traveling axis and a slider traveling along the track member, and a movable arm mechanism (i.e., a robot arm) mounted on the slider, is known. In a production line equipped with a robot, a workpiece is transferred to several locations, such as a workpiece support section inside a machine tool, a feed table on which a workpiece before being loaded into the machine tool is placed, a delivery table on which a workpiece unloaded from a machine tool after being processed by the machine tool is placed, etc. Thus, the robot composed of a traveling axis mechanism and a movable arm mechanism mounted thereon is provided between several transfer locations, so that it becomes possible to enlarge the working space of the movable arm mechanism in the longitudinal direction of the track member, while preventing the dimensions of the movable arm mechanism from increasing, and thus to readily or flexibly transfer the workpiece between the several transfer locations. Further, the robot including the traveling axis mechanism can relatively easily prevent the robot from interfering with the machine tool or other peripheral equipment in comparison with a robot including only a large-sized movable arm mechanism.

Japanese Unexamined Patent Publication (Kokai) No. 5-318249 (JP5-318249A) describes a system including a robot for transferring a workpiece relative to a main spindle of a machine tool or a provisional table, in which the robot is provided inside a housing of the machine tool. The robot includes an arm slidable along a guide rail formed on a beam, and a chuck for holding the workpiece is provided at the distal end of the arm.

Japanese Patent No. 3865703 (JP3865703B) describes an article transfer system in which a workpiece is fed to and delivered from a processing machine by a robot. The robot includes an arm movable along a track member put up or constructed over the front yard of the processing machine. The cover of the processing machine is provided at a front side thereof with an opening allowing the robot arm to access the interior space of the cover. The track member extends in a direction parallel to the front side wall of the cover of the processing machine.

Japanese Unexamined Utility Model Publication (Kokai) No. 6-33690 (JP6-33690U) describes a traverse robot including a robot hand traveling along a traverse rail. The robot hand moves in a vertical direction perpendicular to the extending direction of the traverse rail.

The machine tool is generally configured so that an operator can access the interior space of the cover of the machine tool through the front opening of the cover and perform certain works, when it is necessary to change the type of workpiece or conduct maintenance on workpiece-processing tools attached to the machine tool. The operator's works include replacement, adjustment or inspection of a retention mechanism (such as a table, a chuck, a mold; hereinafter referred to as a workpiece support section) or a workpiece mount section, the replacement of the tools, the washing of mechanical portions, and so on. An operation panel may be provided on a front side of the machine tool.

In a configuration in which a robot arm enters through an opening formed in the cover of a machine tool into the interior space of the cover, it is reasonable to commonly use a front side opening provided for an operator's work as an entrance opening for the robot arm (see, e.g., JP3865703B). However, in this case, the robot arm is disposed at the front side opening of the machine tool during a time when the robot is operating, and therefore, the operator cannot approach the front side opening of the machine tool. Thus, inconvenience may occur in an operator's work that essentially does not need to stop the robot, such as a visual check of a workpiece processing state, or in an operator's work performed simultaneously with the operation of the robot, such as a check for the operation of the robot inside the cover. Further, if the robot arm is located in front of the front side opening of the machine tool when the robot is stopped for, e.g., a maintenance work of the machine tool, a space for allowing the operator to perform the work may be inconveniently narrowed.

In the system configuration described in JP3865703B, for example, an opening for operator's works may be formed in a side wall of the cover of the machine tool, which is different from the front side wall having the entrance opening for the robot arm. In this configuration, the above-described inconveniences in operator's works may be eliminated.

In a case where the above-described robot system is installed in facilities such as a factory, an exclusive pathway, through which an operator can safely pass, may be provided along the longitudinal direction of track member. In this configuration, various components of the robot system can be placed relatively closer to the pathway, and an operator thereby can easily access the respective components for, e.g., a maintenance work. Further, in a case where a plurality of robot systems are laid side-by-side with each other in, e.g., a factory, it is possible to efficiently use spaces for installing the respective robot systems, and thus to establish a reasonable layout, e.g., a parallel arrangement of a plurality of pathways.

In the above layout, if the opening for operator's works is formed in the side wall of the cover of the machine tool, which is different from the front side wall having the entrance opening for the robot arm, it is necessary for an operator to leave the pathway so as to move toward a working space, and thereby the working efficiency of the operator may be lowered. Further, in order to ensure the working space of the operator, the arrangement density of the machine tool and peripheral equipments may be reduced.

On the other hand, for example, the traverse robot described in JP6-33690U may be disposed above the machine tool and configured to shift the robot hand downward into the interior space of the cover through an opening formed in the top wall of the machine tool. In this configuration, it is necessary to locate the traverse rail at a sufficiently higher position above the machine tool. As a result, cost may be increased, and in some facilities such as a factory, it may be difficult to ensure the height for laying the traverse rail.

Further, in a case where the machine tool is configured so that a tool attached to the distal end of a vertically-disposed main spindle operates to process a workpiece immediately beneath the main spindle, it may be difficult, for the traverse robot including the robot hand shiftable in a vertical direction, to allow the robot hand to access the workpiece support section provided immediately beneath the main spindle. In this case, in order to make possible to load/unload the workpiece relative to the workpiece support section provided immediately beneath the main spindle, the additional equipment of a table retracting mechanism for laterally shifting a processing table as the workpiece support section may be required, or the efficiency of the transferring task may be lowered due to the table retracting operation.

Still further, in any of the above-described configurations, when the movable arm mechanism (i.e., the robot arm or the robot hand) is inserted into or pulled out from the interior space of the cover of the machine tool, it is required to shift the orientation of the movable arm mechanism on the track member (i.e., the guide rail or the traverse rail) to a retracted orientation capable of eliminating interference with the mechanical section or cover of the machine tool. The shifting of the orientation of the movable arm mechanism to the retracted orientation may increase a time required for the loading/unloading of the workpiece, and thus may deteriorate the efficiency of the transferring task.

SUMMARY OF THE INVENTION

The present invention is directed to a workpiece transfer robot system in which a robot operates to transfer a workpiece relative to a machine tool, which can improve the convenience or operating efficiency of the system.

According to one aspect of the invention, a workpiece transfer robot system is provided, which comprises a machine tool provided with a workpiece support section; and a robot capable of transferring a workpiece relative to the workpiece support section of the machine tool; the machine tool comprising a cover surrounding at least the workpiece support section, the cover including a first side wall provided with a first opening usable for a workpiece transferring task of the robot; the robot comprising a track member defining a traveling axis extending in a direction perpendicular to the first side wall of the cover of the machine tool; a slider attached to the track member and capable of traveling along the traveling axis; a first arm attached to the slider and capable of swinging about a first swing axis; a second arm attached to the first arm and capable of swinging about a second swing axis parallel to the first swing axis; and a workpiece hold section provided on the second arm and capable of accessing the workpiece support section through the first opening of the cover of the machine tool.

According to the above configuration, in a workpiece transfer robot system in which a robot operates to transfer a workpiece relative to a machine tool, it is possible to improve the convenience or operating efficiency of the system. It is possible to ensure an operator's working space at a side different from the first side wall of the cover of the machine tool. Further, when the workpiece hold section of the robot is inserted into or pulled out from the cover interior space, it is not required to shift the orientation of the movable arm mechanism to a retracted orientation, so that the operating efficiency can be improved.

BRIEF DESCRIPTION OF THE DRAWINGS

The above and other objects, features and advantages of the present invention will become more apparent from the following description of preferred embodiments in connection with the accompanying drawings, wherein:

FIGS. 1A-1D show a robot system according to one embodiment of the present invention;

FIGS. 8A-8D show a modification of the robot system of FIGS. 1A-1D;

FIGS. 9A and 9B show another modification of the robot system of FIGS. 1A-1D, wherein a shared robot performs the loading/unloading of a workpieces relative to a plurality of machine tools;

FIG. 11 is a perspective view showing the robot system of FIGS. 10A-10D.

DETAILED DESCRIPTION

Figure 2:
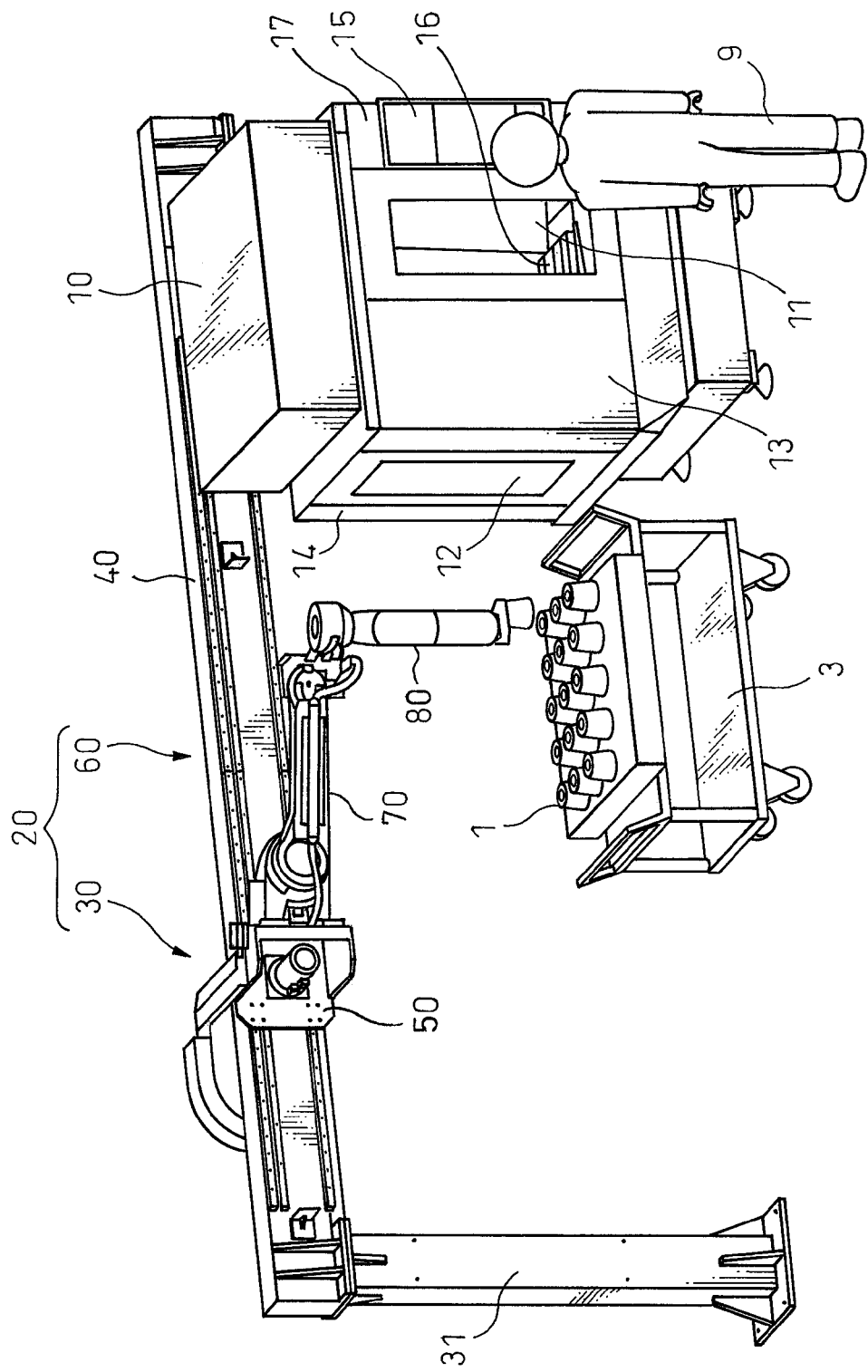
FIG. 2 is a perspective view showing the robot system of FIGS. 1A-1D.

The embodiments of the present invention are described below, in detail, with reference to the accompanying drawings. In the drawings, same or similar components are denoted by common reference numerals.

Referring to the drawings, FIGS. 1A-1D and 2 schematically illustrate an overall configuration of a workpiece transfer robot system according to one embodiment of the present invention. FIG. 1A is a plan view, FIG. 1B is a front view, FIG. 1C is a right side view, FIG. 1D is a left side view, and FIG. 2 is a perspective view.

The workpiece transfer robot system according to the illustrated embodiment (hereinafter referred simply to as a robot system) is configured to include a single robot 20 for transferring a workpiece relative to a single machine tool 10. The robot 20 includes a traveling axis mechanism 30 including a track member 40 defining a traveling axis 43 and a slider 50 attached to the track member 40 and capable of sliding and traveling along the traveling axis 43, and a movable arm mechanism 60 including two arms 70, 80 capable of performing a swing motion.

In the illustrated embodiment, the machine tool 10 may have various known machine configurations, such as a injection molding machine, a press machine, an assembling machine, a lathe, a milling machine, a machining center, etc., which perform predetermined processing such as the molding of a workpiece from a material, the coupling of a component to a supplied workpiece, the machining of a unprocessed workpiece. The details of machine tool 10 are not described.

The machine tool 10 is provided with a workpiece support section 16 adapted to support a workpiece 1 and a cover 17 surrounding at least the workpiece support section 16. The cover 17 is provided with openings 11, 12 (both may have opening/closing doors) formed to allow the movable arm mechanism 60 and/or an operator 9 to access the workpiece support section 16 inside the cover 17. Although not shown in detail, in one exemplary configuration of the machine tool, the workpiece support section 16 is formed by a processing table, and a main spindle equipped with a chuck for holding a working tool is disposed above the workpiece support section 16.

In the illustrated embodiment, the cover 17 of the machine tool 10 includes a front side wall 13 provided with the opening 11 and an operation panel 15, and a left side wall 14 located at the left side of the front side wall 13 as seen in the drawing and provided with the opening 12. The opening 11 in the front side wall 13 is used to allow the operator 9 to access the interior space of the cover 17 of the machine tool 10 so as to perform desired works such as maintenance.

The opening 12 in the left side wall 14 of the machine tool 10 is located at a position separated from the front side opening 11, and is used to allow the robot 20 load or unload a workpiece 1 relative to the workpiece support section 16 of the machine tool 10. The robot 20 operates to hold a workpiece 1 placed on a carriage 3 by the movable arm mechanism 60 disposed at a desired position on the traveling axis mechanism 30, shift the movable arm mechanism 60 along the track member 40, and insert the arm distal end into the interior space of the cover 17 through the opening 12 in the left side wall 14, so as to attach the workpiece 1 to the workpiece support section 16 (i.e., a loading task); and/or operates to hold the workpiece 1 that has been processed in the machine tool 10 and detach the workpiece 1 from the workpiece support section 16 by the movable arm mechanism 60 inserting the arm distal end thereof into the cover interior space, and take out the workpiece 1 from the cover 17 through the opening 12 in the left side wall 14, so as to place the workpiece 1 on the carriage 3 (i.e., an unloading task).

In order to efficiently perform the above-described work transfer operation, the carriage 3 for carrying the workpieces 1 thereon is disposed adjacent to the left side wall 14 of the cover 17 provided with the opening 12, and the track member 40 is arranged to extend in a direction perpendicular to the left side wall 14 of the cover 17 (i.e., a leftward/rightward direction in the drawing). More specifically, the carriage 3 carrying the workpieces 1 is disposed in the neighborhood of the opening 12 allowing the robot 20 to transfer the workpiece 1 therethrough relative to the machine tool 10, and the traveling axis 43 defined by the track member 40 is oriented in a direction joining the opening 12 and the carriage 3 (i.e., the direction perpendicular to the left side wall 14 of the cover 17), so that the robot 20 can execute an efficient operation.

The carriage 3 may be replaced by a conveyor, etc. Further, a carriage 3 or conveyor, etc., for carrying a workpiece 1 before being processed and a carriage 3 or conveyor, etc., for carrying a workpiece 1 after being processed may be provided separately from each other. Although it is preferred that the carriage 3 is disposed near the opening 12 so as to efficiently perform the transferring task, the position of the carriage 3 is not limited thereto so long as the carriage 3 is disposed within the operational space of the robot 20.

The track member 40 of the traveling axis mechanism 30 is supported at the opposite ends thereof by two pillars 31 set up on a floor face 100 on which the machine tool 10 is installed, and thereby is put up or constructed above and arranged generally parallel to the floor face 100. Three or more pillars 31 may be provided as occasion demands. Further, the pillars 31 are not necessarily disposed at the opposite ends of track member 40, but may be disposed at intermediate positions of the track member 40. The track member 40 may also be supported in a cantilevered manner. In any case, the track member 40 is advantageously configured to have stiffness sufficient to stably support a total load of the slider 50, movable arm mechanism 60 and workpiece 1.

The track member 40 is preferably disposed at a relatively high position above the floor face 100 (e.g., a position corresponding to the overall height of the machine tool 10), so as to prevent the movable arm mechanism 60 from interfering with the track member 40 during the execution of a workpiece transferring operation by the movable arm mechanism 60. However, the track member 40 may be disposed at a relatively low position (e.g., a position lower than the overall height of the machine tool 10), provided that the movable arm mechanism 60 does not interfere with the track member 40 in the operating range of the movable arm mechanism 60 required for the workpiece transferring operation.

In the illustrated embodiment, the machine tool 10 has an outer profile in which the height of a rearward portion is lower than the height of a central portion, and thus the track member 40 is arranged to pass a space above the rearward portion of the machine tool 10 so as to extend over the machine tool 10 (FIGS. 1A-1D). In the rearward of the machine tool 10, a maintenance area for, e.g., collecting a cutting fluid, cutting wastes, etc., may be provided adjacent to the floor face 100, and even in this case, an idle space may be created above the maintenance area. The machine tool 10 of the illustrated embodiment has the low-profiled rearward portion, and thus a space defined thereabove is effectively used for the layout of the track member 40, so as to reduce the overall height of the robot system. Thus, a volume occupied by the entire robot system is decreased.

Figure 3:
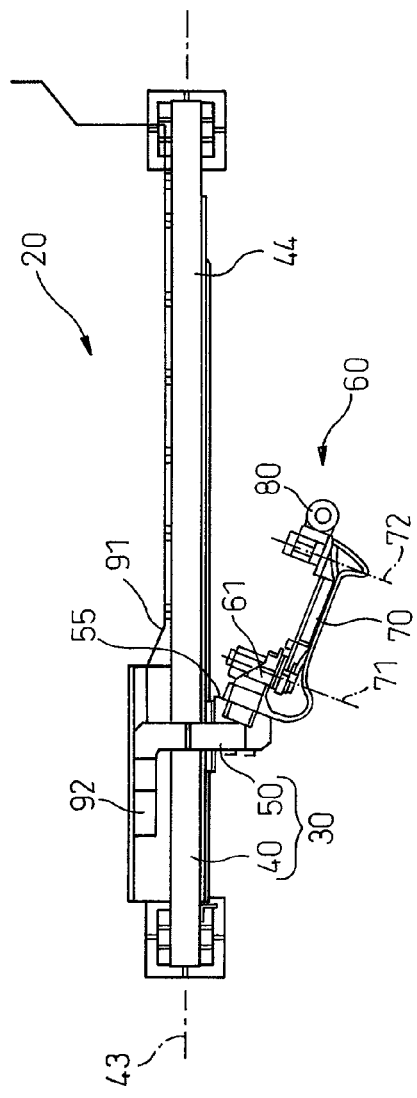
FIGS. 3A-3D show a robot in the robot system of FIGS. 1A-1D.
Figure 4:
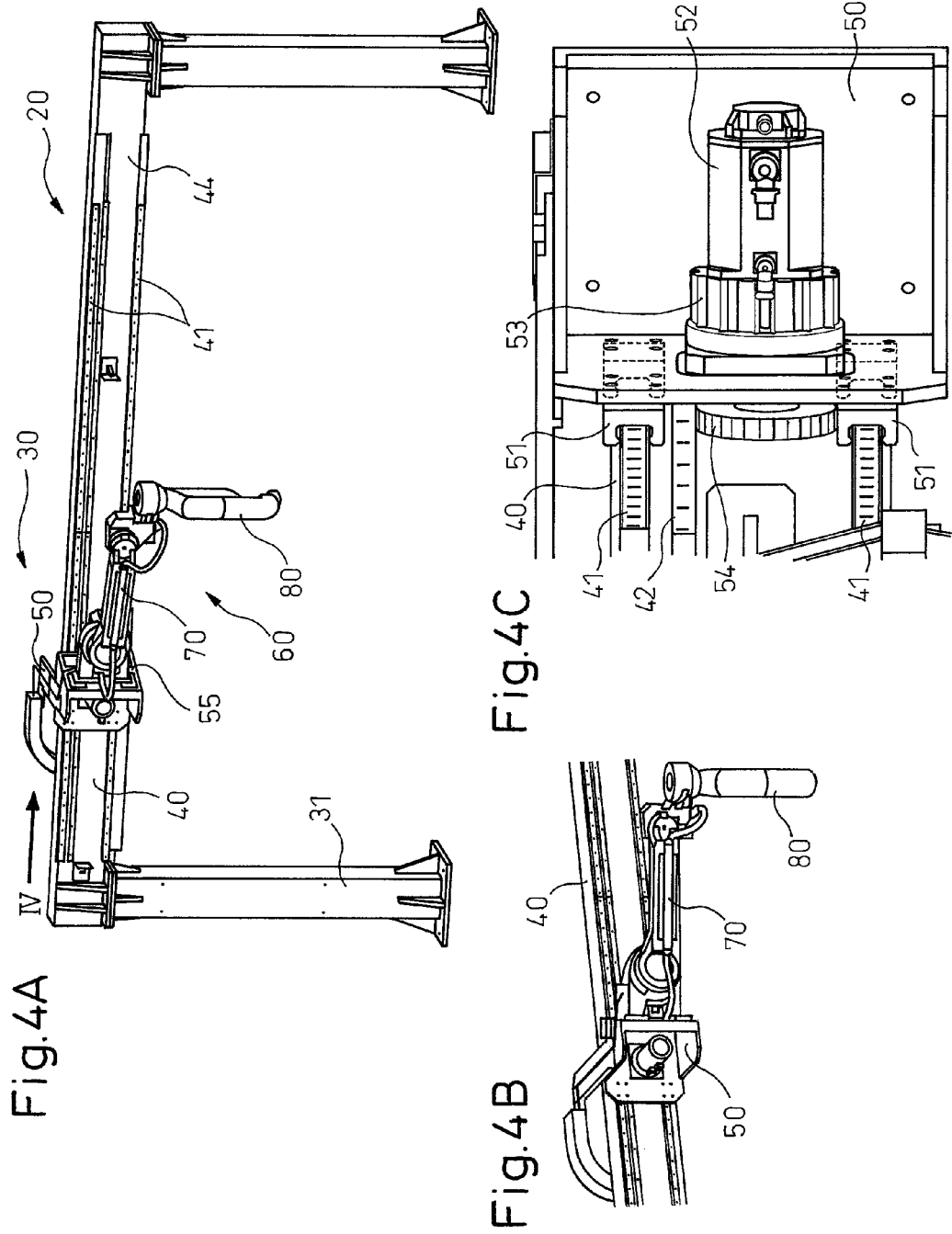
FIGS. 4A-4C are perspective views showing a robot in the robot system of FIGS. 1A-1D.

FIGS. 3A-3D and FIGS. 4A-4C illustrate only the robot 20 shown in FIGS. 1A-1D and FIG. 2 in more detail. FIG. 3A is a plan view, FIG. 3B is a front view, FIG. 3C is a left side view, and FIG. 3D is a right side view. FIG. 4A is a perspective view showing the entire appearance of the robot 20, FIG. 4B is a perspective view showing parts of the slider 50 and movable arm mechanism 60 in an enlarged manner, and FIG. 4C is an enlarged perspective view showing a mechanical part of the slider 50 as seen in the direction of an arrow IV in FIG. 4A.

As illustrated, the track member 40 is provided on the lateral face 44 thereof with two rails 41 disposed side-by-side at high and low positions and extending parallel to each other, the lateral face 44 facing away from the floor face 100 on which the robot 20 is installed (i.e., facing a same direction as the front side wall 13 of the machine tool 10 (FIG. 2)). The slider 50 is provided with total four blocks 51 fixed to the slider 50, respective two blocks 51 being slidably engaged with one rail 41 of the track member 40. The rails 41 and the blocks 51 cooperate with each other so as to constitute LM (linear motion) guides for guiding the slider 50 to move along the traveling axis 43 on the track member 40.

As shown in FIG. 4C, a traveling axis drive motor 52 for driving the slider 50 is attached to the slider 50, and a pinion 54 is fixed to an output shaft of a reduction gear unit 53 connected to the drive motor 52. A rack 42 engaged with the pinion 54 of the slider 50 is formed on the track member 40 and parallel to the rails 41. In this configuration, the rotational motion of the traveling axis drive motor 52 is decelerated by the reduction gear unit 53 and transmitted to the pinion 54, and is converted to the linear motion of the slider 50 along the rails 42 due to the engagement between the pinion 54 and the rack 42.

As shown in FIGS. 3A-3D, a first arm 70 of the movable arm mechanism 60 is attached or joined, at one end thereof, to a base member 61 of the movable arm mechanism 60 in a manner capable of swinging about a first swing axis 71. A second arm 80 is attached or joined, at one end thereof, to the other end of the first arm 70 in a manner capable of swinging about a second swing axis 72 parallel to the first swing axis 71.

In the illustrated embodiment, the slider 50 is provided with an arm mount surface 55 extending in a direction obliquely intersecting with respect to the traveling axis 43 and the lateral face 44 of the track member 40, the arm mount surface 55 facing a diagonally right near-side as seen in the drawing. The first arm 70 of the movable arm mechanism 60 is attached to the arm mount surface 55 through the base member 61. As a result, the first and second swing axes 71, 72 of the movable arm mechanism 60 extend parallel to both of the arm mount surface 55 of the slider 50 and the floor face 100 on which the robot 20 is installed, and are arranged to obliquely intersect with the traveling direction of the slider 50 (i.e., the traveling axis 43). Thus, the traveling axis 43 and the first and second swing axes 71, 72 are arranged in a virtual plane extending horizontally to the floor face 100 on which the robot 20 is installed.

The traveling axis drive motor 52 and the reduction gear unit 53 are placed on the slider 50 in an area behind the arm mount surface 55 and adjacent to the track member 40. In this configuration, the traveling axis drive motor 52 and the reduction gear unit 53 can be disposed in an available space created by providing the arm mount surface 55, and it is thereby possible to prevent the slider 50 from being enlarged.

As shown in FIGS. 3B-3D, the second arm 80 includes a first base 81 joined to the first arm 70 in a manner capable of swinging about the second axis 72, and a shaft portion 82 joined to the base section 81 in a manner capable of rotating about a third rotation axis 73 orthogonal to the second swing axis 72, the shaft portion 82 extending along the third rotation axis 73. The second arm 80 is also provided at the distal end of the shaft portion 82 with a workpiece hold section 85 capable of accessing the workpiece support section 16 through the opening 12 (FIG. 2) of the cover 17 of the machine tool 10. The workpiece hold section 85 includes a second base 86 joined to the shaft portion 82 in a manner capable of swinging about a fourth swing axis 74 orthogonal to the third rotation axis 73, and a distal portion 87 joined to the second base 86 in a manner capable of rotating about a fifth rotation axis 75 orthogonal to the fourth swing axis 74. The distal portion 87 is equipped with a workpiece holding mechanism for holding the workpiece 1. The workpiece holding mechanism is configured preferably by a gripping-type or absorptive-retaining type robot hand, but may be configured by, e.g., an elastic pawl, a hook member, etc., capable of fitting into a specific aperture previously formed in the workpiece.

In the configuration described above, the robot 20 has six degrees of freedom of motion, i.e., a linear motion along the traveling axis 43 and swings and rotations about the first to fifth axes 71-75 (i.e., first swing axis 71, second swing axis 72, third rotation axis 73, fourth swing axis 74 and fifth rotation axis 75). As a result, the robot 20 can control the position and orientation of the workpiece 1 held by the workpiece hold section 85. More specifically, the distal portion 87 of the workpiece hold section 85 provided on the second arm 70 can be located at various desired positions by adjusting the position of the slider 50 on the track member 40 and the respective swing angles of the first and second arms 70, 80 about the first and second swing axes 71, 72. Further, the distal portion 87 of the workpiece hold section 85 provided on the second arm 70 can be located at various desired orientations by adjusting the respective rotation and swing angles of the shaft portion 82 and the second base 86 and distal portion 87 of the workpiece hold section 85 about the third to fifth axes 73-75 (i.e., third rotation axis 73, fourth swing axis 74 and fifth rotation axis 75).

Although not shown in detail, the movable arm mechanism 60 is equipped with five servo-motors for controlling respectively the swings and rotations about the first to fifth axes 71-75, with one servo-motor being provided for one axis. The five servo-motors and the traveling axis drive motor 52 are connected via an internal cable including a power line and a signal line to a distribution board 90 (FIG. 3B) attached to the slider 50, and are connected to and controlled by a controller 95 (FIG. 1A) via a connection cable 91 (FIG. 3A) through the distribution board 90. The length of a part of the connection cable 91 extending along the track member 40 varies due to the linear motion of the slider 50, so that the slider 50 is equipped with a cable guide 92 adapted to receive the bending portion of the connection cable 91. In the illustrated embodiment, the cable guide 92 is disposed at the rear side of the track member 40, so as to prevent the height dimension of the slider 50 from increasing.

In the robot 20 having the above configuration, as already described, the first and second swing axes 71, 72, as the center axes of the swing motions of the first and second arms 70, 80 of the movable arm mechanism 60, are inclined with respect to the traveling direction of the slider 50, i.e., the traveling axis 43. As a result, the first and second arms 70, 80 can be arranged at an orientation obliquely protruding in a direction from the track member 40 toward the machine tool 10. Therefore, even when the track member 40 is disposed near the back side of the machine tool 10 as illustrated, it is possible to easily make the workpiece hold section 85 at the distal end of the second arm 80 reach the workpiece support section 16 (FIG. 2) that is most likely provided at generally the center of the machine tool 10, through the opening 12 also located at generally the center of the cover left side wall 14 (FIG. 2) of the machine tool 10.

Further, since the first and second swing axes 71, 72 are inclined with respect to the traveling direction of the slider 50, it is possible to locate the workpiece hold section 85 at the distal end of the second arm 80 at a desired position in a direction (shown by an arrow Y in FIG. 1A) perpendicular to the traveling direction of the slider 50 by adjusting the swing angles of the first and second arms 70, 80. Therefore, it is possible to dispose the workpiece hold section 85 at widespread positions in the cover interior space of the machine tool 10.

One example of the workpiece transferring operation of the robot 20 in the illustrated embodiment will be described below with reference to FIGS. 5-7.

Figure 5:
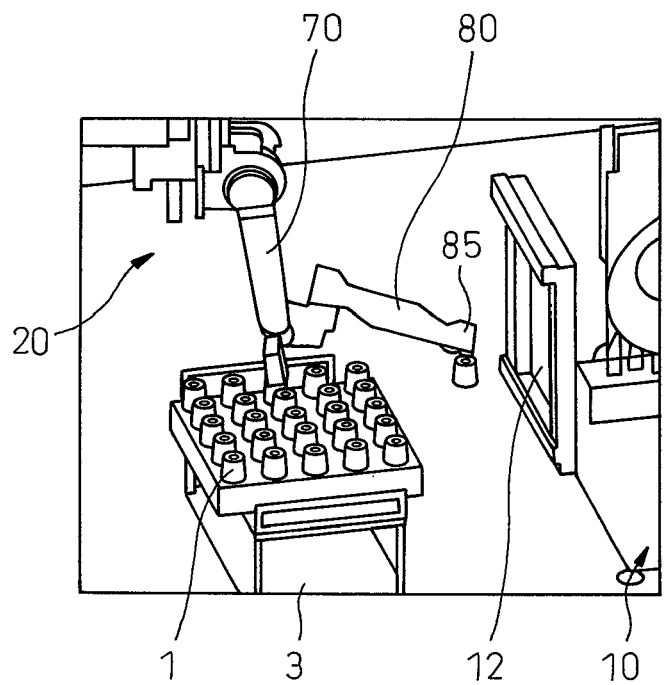
FIG. 5 shows a state where the robot is in readiness before entering a machine tool, in the robot system of FIGS. 1A-1D.

FIG. 5 shows a state where the robot 20 is in readiness while holding the workpiece 1, at a location in front of the opening 12 in the cover left side wall 14 (FIG. 2) of the machine tool 10. In this state, the first and second arms 70, 80 are arranged at an orientation protruding obliquely with respect to the track member 40 and in a direction toward the machine tool 10. As a result, the workpiece hold section 85 at the distal end of the second arm 80 is positioned just oppositely to the opening 12 located at generally the center of the cover left side wall 14 (FIG. 2) of the machine tool 10.

Figure 6:
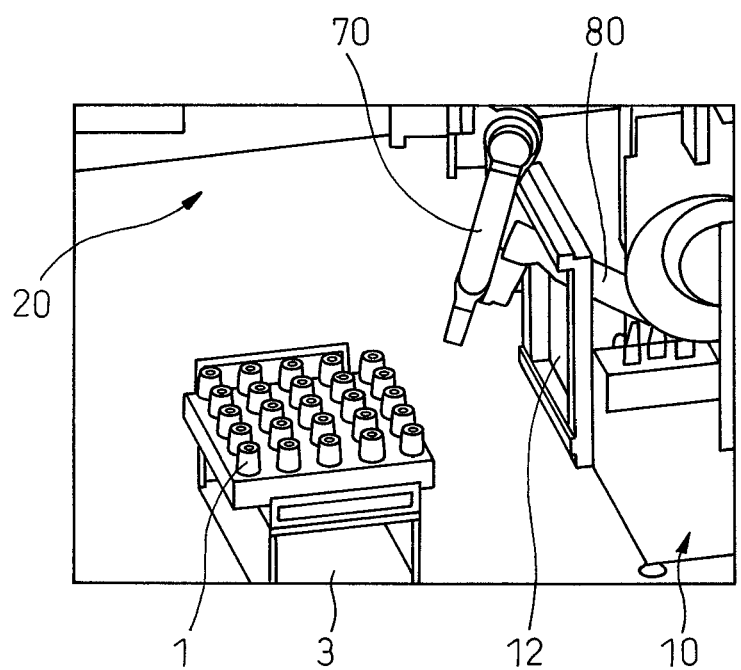
FIG. 6 shows a state where the robot is loading a workpiece into a machine tool, in the robot system of FIGS. 1A-1D.

Starting from the state shown in FIG. 5, the slider 50 of the traveling axis mechanism 30 is moved in a direction approaching the machine tool 10, and thereby it is possible to insert the second arm 80 into the cover interior space of the machine tool 10 through the opening 12 (see FIG. 6). In this state, the workpiece hold section 85 is operated so as to permit the robot 20 to perform the loading of the workpiece 1 to the machine tool 10.

In this connection, if a robot arm is tried to be inserted into the cover interior space of the machine tool 10 through the front side opening 11 (FIG. 2) of the cover 17 as conventionally performed, the robot arm should be moved to a large extent after being positioned in front of the opening 11 (FIG. 2) on the track member, so as to finally insert the distal end of the robot arm into the cover interior space. In contrast to this, in the robot system according to the illustrated embodiment, once the workpiece hold section 85 at the distal end of the movable arm mechanism 60 is positioned just oppositely to the cover left side wall 14 (FIG. 2) of the machine tool 10, it is possible to insert the workpiece hold section 85 into the cover interior space without the substantial operation of the first and second arms 70, 80, and thereby to efficiently perform the loading operation. Similarly, after the workpiece 1 is attached to the workpiece support section 16 (FIG. 2), it is possible to pull out the workpiece hold section 85 from the machine tool 10 only by the operation of the slider 50 of the traveling axis mechanism 30 without the substantial operation of the first and second arms 70, 80. More specifically, when the workpiece hold section 85 is inserted into or pulled out from the cover interior space, it is not required to shift the orientation of the movable arm mechanism 60 on the track member 40 to a retracted orientation capable of eliminating interference with the mechanical section or cover 17 of the machine tool 10, so that the workpiece transfer task can be efficiently performed.

Further, in the readiness state shown in FIG. 5, the movable arm mechanism 60 can be previously arranged at an orientation similar to an orientation at a time when the workpiece 1 is attached to the workpiece support section 16 (FIG. 2), and thereby it is possible to further improve the efficiency of the loading operation. Still further, since the movable arm mechanism 60 is inserted into the cover interior space in a lateral direction relative to the machine tool 10, even when a tool main spindle of the machine tool 10 is vertically disposed and the workpiece support section 16 is disposed immediately beneath the tool main spindle, the movable arm mechanism 60 can efficiently attach the workpiece 1 to the workpiece support section.

Figure 7:
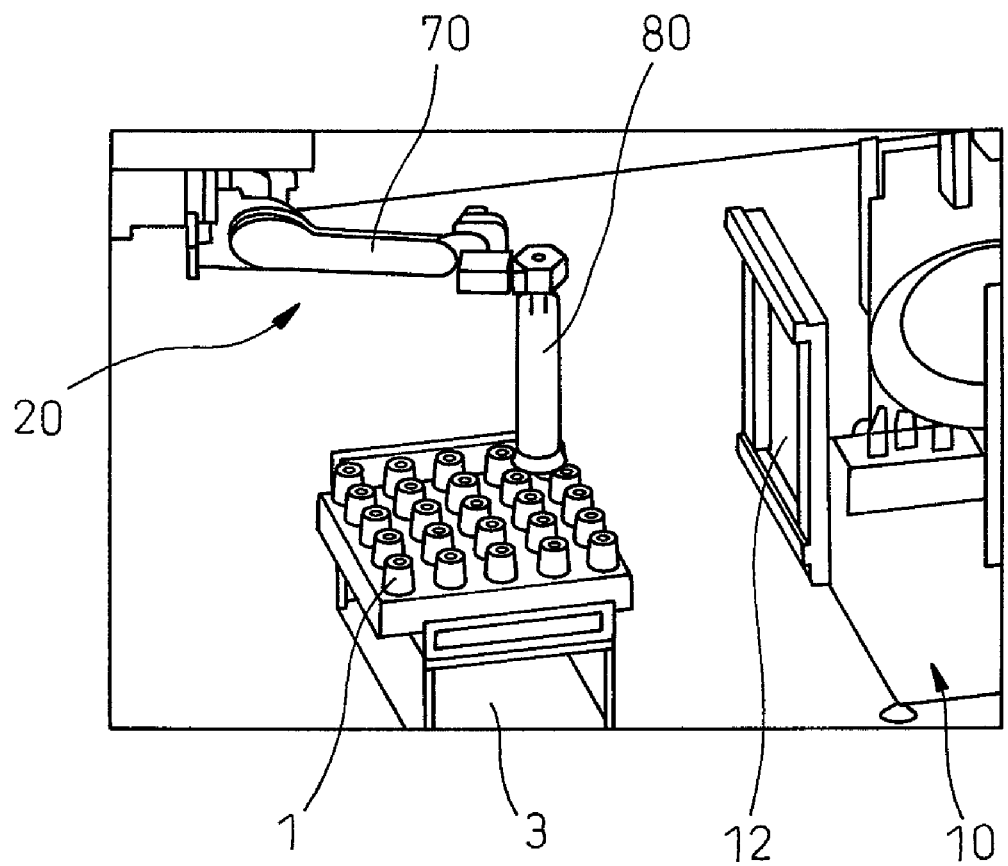
FIG. 7 shows a state where the robot is unloading a workpiece from a machine tool, in the robot system of FIGS. 1A-1D.

FIG. 7 shows a state where the robot 20 is unloading a workpiece 1 from the machine tool 10 to the carriage 3. In this state, the movable arm mechanism 60 has been moved in a direction away from the machine tool 10 by the operation of the slider 50 of the track member 40 from the state shown in FIG. 6, and thereafter the first and second arms 70, 80 are arranged at an orientations suitable for placing the workpiece 1 on the carriage 3.

In the above-described operation of the robot 20, it is preferable that the operation path of the workpiece hold section 85 of the movable arm mechanism 60 can be controlled so that the workpiece hold section 85 can eliminate interference with, e.g., mechanical sections inside the cover of the machine tool 10. Regarding the control of an operation path, it is beneficial that the operation path can be set on the basis of an arbitrary rectangular coordinate system, for the reasons of, e.g., easiness in the operator's setting. In this regard, in the robot 20 of the illustrated embodiment, since the first and second swing axes 71, 72 are inclined with respect to the traveling axis 43, it is preferable to use a coordinate system including axes respectively parallel to the first and second swing axes 71, 72 as the rectangular coordinate system for setting the operation path. It should be noted that the robot 20 may have a configuration for performing either one of the above-described loading and unloading operations with respect to the machine tool 10.

As described above, in the robot system of the illustrated embodiment, since the movable arm mechanism 60 is traveled along the traveling axis 43 (or the track member 40) extending in the direction perpendicular to the cover left side wall 14 of the machine tool 10, in which the opening 12 used for the workpiece transferring task of the robot 20 is formed, it is possible to efficiently perform the workpiece transferring operation. Further, since the first and second axes 71, 72 of the movable arm mechanism 60 are inclined with respect to the traveling axis 43 (or the track member 40), it is possible, for the robot 20 including the movable arm mechanism 60 having relatively simple axes configuration, to easily make the workpiece hold section 85 to access widespread positions in the cover interior space of the machine tool 10, so as to perform the loading/unloading operation of the workpiece 1. The raveling axis mechanism 30 of the illustrated embodiment also has a relatively simple configuration using a single axis LM guide. Therefore, the robot system of the illustrated embodiment possesses a simple configuration as a whole, which can eliminate the use of special mechanisms or the increase in its own dimensions.

Further, in the robot system of the illustrated embodiment, when the robot 20 transfers the workpiece 1 relative to the machine tool 10, the movable arm mechanism 60 of the robot 20 does not have to enter an area facing the front side wall 13 of the machine tool 10. Therefore, even during a time when the robot 20 is operating, it is possible to ensure a working space where the operator 9 (FIG. 2) performs a work at a location in front of the front side wall 13 of the machine tool 10. Further, if the robot system is stopped for, e.g., maintenance work, regardless of the stopping position or orientation of the robot 20, it is possible to safely ensure the working space at a location in front of the front side wall 13 of the machine tool 10 and to eliminate the obstruction by the stopped robot 20 in the operator's work. Although FIG. 2 shows an example in which the operation panel 15 is disposed at the right area of the front side wall 13 of the machine tool 10 as seen in the drawing, even if the operation panel 15 is disposed at the left area of the front side wall 13 of the machine tool 10, there will be no problem for the manipulation of the operation panel 15.

For convenience of works performed by the operator 9, as shown in FIG. 1A, it is preferable to provide a pathway 5, through which the operator 9 can pass, along the front side wall 13 of the machine tool 10. In the example shown in FIG. 1A, a safety fence 7 is also provided along the pathway 5 to prevent the operator 9 from entering an area allowing the operator 9 to access the movable sections of machines such as the robot 20. The robot 20 can be controlled with an entry restriction by a mechanical stopper or software, so as to prevent the movable arm mechanism 60 from entering the pathway 5 across the safety fence 7.

In this connection, the movable arm mechanism 60 of the robot 20 does not enter the area in front of the machine tool 10, so that the safety fence 7 is not extended to the area in front of the machine tool 10. As a result, it is possible to provide the pathway 5 adjacent to the front side wall 13 of the machine tool 10, and thereby the operator 9 can directly and efficiently perform required works, such as the maintenance work, from the pathway 5 to the machine tool 10.

In the layout shown in FIG. 1A, the track member 40 is arranged parallel to the pathway 5. Therefore, the operator 9 can clearly check the overall condition of the robot 20 from the pathway 5. In this regard, there is a case where apparatuses such as the robot system of the illustrated embodiment are arranged along both sides of the pathway 5 in a factory and a space is restricted in a direction intersecting the pathway 5. In this case, the configuration of the illustrated embodiment in which the track member 40 is arranged parallel to the pathway 5 is beneficial.

It should be noted that the above-described embodiment merely exemplifies the present invention, and various changes can be made within the scope of the present invention defined by the appended claims.

For example, in the above embodiment, the movable arm mechanism 60 of the robot 20 is provided for the second arm 80 and the workpiece hold section 85 with the third to fifth axes 73-75. In this configuration, it is possible to appropriately adjust the orientation of the workpiece 1, in the loading/unloading operation for the workpiece 1 relative to the machine tool 10 or in the picking up/putting down operation for the workpiece 1 relative to the carriage 3. However, if the orientation of the workpiece 1 is not adjusted during the workpiece transferring task, the third to fifth axes 73-75 may be omitted. Further, the workpiece holding mechanism provided on the distal portion 87 of the workpiece hold section 85 may be configured in such a manner as to hold the workpiece 1 at a predetermined relative position and orientation, so that, in the loading/unloading operation for the workpiece 1 relative to the machine tool 10 or in the picking up/putting down operation for the workpiece 1 relative to the carriage 3, the workpiece 1 can be arranged at an appropriate orientation only by the operations of the first and second swing axes 71, 72.

Further, the movable arm mechanism 60 may have a configuration wherein a telescopic mechanism is additionally combined with the swing/rotation mechanism in the illustrated embodiment. Thereby, it is possible to increase the operable area of the robot 20.

In the above embodiment, the movable arm mechanism 60 is mounted on the arm mount surface 55 provided as a slanted surface in the slider 50. In this configuration, it is possible to change the inclination angle of the first swing axis 71 relative to the traveling axis 43 so as to comply with various robot systems with the movable arm mechanism 60 being commonly used, by modifying, e.g., the slant angle of the arm mount surface 55 of the slider 50. In this arrangement, the arm mount surface 55 of the slider 50 may be configured so that the slant angle thereof is adjustable. In addition to or in place of the above configuration, the movable arm mechanism 60 may be provided with a slanted attachment surface. Alternatively, the movable arm mechanism 60 may be configured so that a mutually mount or attachment surface extending in a direction perpendicular to the traveling axis 43 is provided between the slider 50 and the movable arm mechanism 60, and that the first swing axis 71 is oriented to be inclined with respect to the traveling axis 43.

It is preferable that the controller 95 of the robot 20 is configured so that an operator can set and input the inclination angle of the first swing axis 71, so as to appropriately control the robot 20 in accordance with the inclination angle set by the operator. In this configuration, it is possible to use the controller 95 widely in various robot systems having various inclination angles of the first swing axis 71.

In the above embodiment, the arm mount surface 55 of the slider 50, to which the movable arm mechanism 60 is mounted, faces in a direction toward the machine tool 10 (i.e., faces a diagonally right near-side, as seen in the drawing, relative to the lateral face 44 of the track member 40). However, the arm mount surface 55 may be slanted in a reverse direction. FIGS. 8A-8D show a modification of a robot system having such a configuration; wherein FIG. 8A is a plan view, FIG. 8B is a front view, FIG. 8C is a perspective view of an area around the machine tool from the left side thereof, and FIG. 8D is a right side view. In these drawings, components corresponding to those in the embodiment shown in FIGS. 1A-7 are denoted by the same reference numerals, and the detailed descriptions thereof are not repeated.

In the modification shown in FIGS. 8A-8D, an arm mount surface 57 of the slider 50, to which the movable arm mechanism 60 is mounted, faces in a direction away from the machine tool 10 (i.e., faces a diagonally left near-side, as seen in the drawing, relative to the lateral face 44 of the track member 40), in a manner opposite to the embodiment shown in FIGS. 1A-7. In this configuration, the track member 40 is disposed at a location nearer the front side wall 13 of the machine tool 10, in comparison with the location thereof in the embodiment of FIGS. 1A-7, and the movable arm mechanism 60 is arranged to obliquely extend in a direction from the front side to the rear side of the machine tool 10.

Also in the configuration illustrated in FIGS. 8A-8D, the first and second swing axes 71, 72 (FIG. 3A) of the movable arm mechanism 60 extend obliquely with respect to the traveling axis 43 (or the track member 40), it is possible to locate the workpiece hold section 85 at the distal end of the second arm 80 at a desired position in a direction perpendicular to the lateral face 44 of the track member 40 by adjusting the swing angles of the first and second arms 70, 80. Therefore, it is possible to dispose the workpiece hold section 85 of the robot 20 at widespread positions in the cover interior space of the machine tool 10. This effect can be generally obtained in a configuration in which the first and second swing axes 71, 72 are inclined in a horizontal plane based on the floor face 100 relative to the traveling direction of the slider 50 (i.e., the traveling axis 43).

Further, the arm mount surface 55, 57 of the slider 50, to which the movable arm mechanism 60 is mounted, may be slanted downward or upward with respect to the lateral face 44 of the track member 40. In this arrangement, the operating range of the first arm 70 can be altered. The first arm 70 is subjected to a restriction of the operating range thereof in a space beneath the slider 50, due to an interference between the first arm 70 and the slider 50 (in particular, the arm mount surface 55, 57). Therefore, it is possible to increase the operating range of the first arm 70 in the space beneath the slider 50, by slanting the arm mount surface 55, 57 downward or upward as occasion demands.

It should be noted that the present invention is not limited to the configuration in which the traveling axis 43 of the robot 20 constantly obliquely intersects with the first swing axis 71 as described in the illustrated embodiment. For example, in FIGS. 3A and 3B, an alternative configuration may be provided, in which the arm mount surface 55 of the slider 50 is disposed orthogonally to the lateral face 44 of the track member 40 at a location farther from the lateral face 44 than the location in the illustrated configuration, and a vertically extending swing axis is added at the mutual joint portion of the slider 50 and the first arm 70. In this configuration, the workpiece hold section 85 of the robot 20 can also be disposed at widespread positions in the cover interior space of the machine tool 10.

The present invention can also be applied to a robot system in which a single robot operates to transfer a workpiece relative to a plurality of machine tools 10. FIGS. 9A and 9B show an exemplary configuration of such robot system in which a single robot 20 operates to transfer a workpiece relative to two machine tools 10a, 10b; wherein FIG. 9A is a plan view and FIG. 9B is a front view. In these drawings, components corresponding to those in the embodiment shown in FIGS. 1A-7 are denoted by the same reference numerals, and the detailed descriptions thereof are not repeated.

Typically, time spent on the processing of the workpiece 1 by each machine tool 10a, 10b is longer that time spent on the transfer of the workpiece 1 by the robot 20. Therefore, in the system configuration in which a single robot 20 is used for a plurality of machine tools 10a, 10b, it is possible to efficiently perform the transferring task.

Two machine tools 10a, 10b are arranged side-by-side in a row along the extending direction of the track member 40, in such a manner that the front side walls 13 thereof, in each of which the opening 11 and operation panel 15 are provided for the operator's work, face the pathway 5. More specifically, the front side wall 13 of any one of the machine tools 10a, 10b is arranged at the same side as the front side wall 13 of another one of the machine tools 10a, 10b. Although not shown, each machine tool 10a, 10b is provided in the cover left side wall 14 thereof with an opening allowing the movable arm mechanism 60 of the robot 20 to access the workpiece support section 16 (FIG. 2), in a way similar to the machine tool 10 shown in FIGS. 1A-2. The carriage 3 for carrying workpieces 1 to be transferred to the machine tools 10a, 10b is disposed in front of the cover left side wall 14 of the left-side machine tool 10a. Alternatively, two separate carriages 3, one of which is used for the machine tool 10a and the other is used for the machine tool 10b, may be used.

The track member 40 extends across two machine tools 10a, 10b at a location above them in a rightward/leftward direction as seen in the drawing. The robot 20 can make the movable arm mechanism 60 pass above the left-side machine tool 10a and access the right-side machine tool 10b. In the example shown in FIGS. 9A, 9B, the machine tool 10a is provided by removing a ceiling cover of the machine tool 10 shown in FIG. 2 and the height of the machine tool 10a is reduced in comparison with that of the machine tool 10, so as to permit the movable arm mechanism 60 to pass above the machine tool 10a. In a case where the ceiling cover is not removed, the track member 40 may be disposed at a higher position.

Also in the configuration shown in FIGS. 9A, 9B, the robot 20 does not have to enter areas in front of the cover front side walls 13 of the machine tools 10a, 10b during the workpiece transferring task, and can be controlled so as to be prevented from entering the areas in front of the cover front side walls 13 by using a mechanical stopper or software as occasion demands. As a result, it is possible to eliminate a part of the safety fence 7 disposed in front of the cover front side walls 13 of the machine tools 10a, 10b, and thereby the operator 9 can directly and efficiently perform required works from the pathway 5 to the machine tools 10a, 10b. Further, the operator 9 can access both machine tools 10a, 10b from the common pathway 5, and therefore, when a maintenance work for both machine tools 10a, 10b is simultaneously performed, it is possible to improve the efficiency of the work.

Figure 10A:
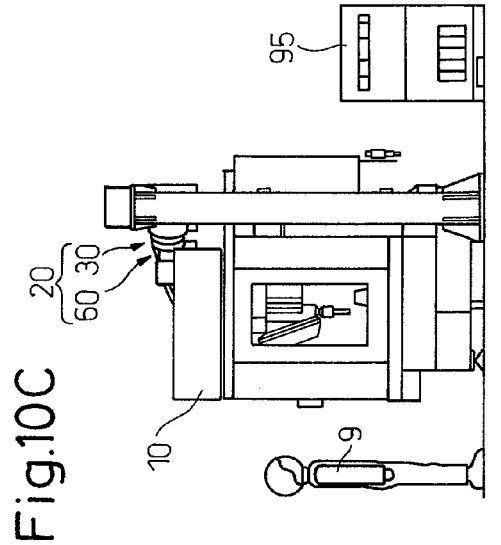
FIGS. 10A-10D show yet another modification of the robot system of FIGS. 1A-1D, wherein a movable arm mechanism is mounted on a bottom face of a track member.
Figure 10B:
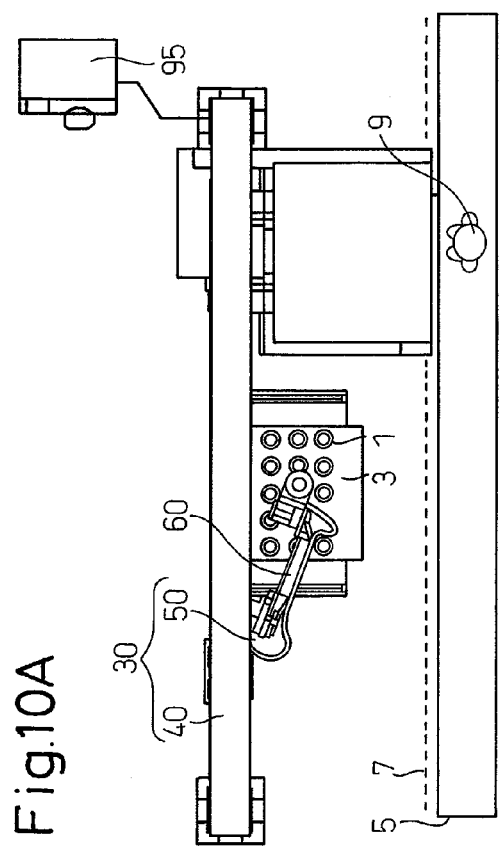
Figure 10C:
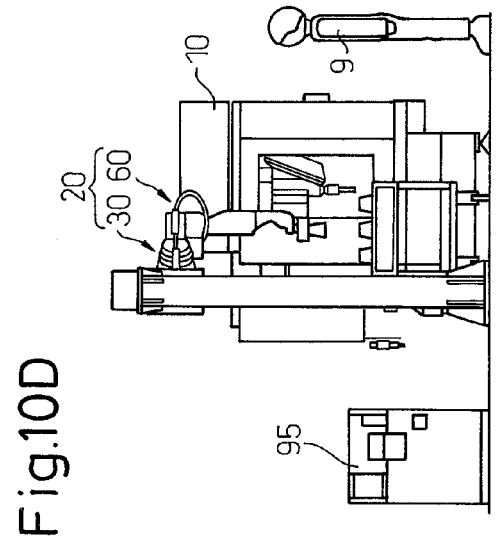
Figure 10D:
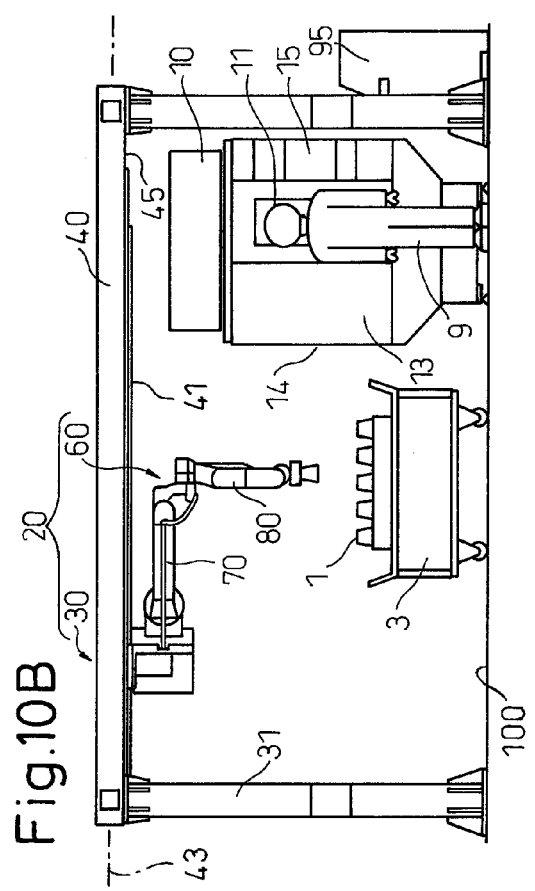

In the illustrated embodiment, the slider 50 is configured to travel along the rails 41 formed on the lateral face 44 of the track member 40. Alternatively, the slider 50 may be configured to travel along a bottom face of the track member 50, i.e., as a suspended configuration. FIGS. 10A-10D and 11 show a modified robot system having such configuration; wherein FIG. 10A is a plan view, FIG. 10B is a front view, FIG. 10C is a right side view, FIG. 10D is a left side view, and FIG. 11 is a perspective view. In these drawings, components corresponding to those in the embodiment shown in FIGS. 1A-7 are denoted by the same reference numerals, and the detailed descriptions thereof are not repeated.

In the illustrated modification, the track member 40 is provided on the bottom face 45 thereof with two rails 41 extending parallel to each other (only one rail 41 is shown), the bottom face 45 facing the floor face 100 on which the robot 20 is installed. The rails 41 cooperate with the blocks 51 (FIG. 4C) provided in the slider 50, so as to constitute LM guides for guiding the slider 50 along the traveling axis 43 on the track member 40.

In the above configuration, since the slider 50 is arranged beneath the track member 40, the extent of projection of the movable arm mechanism 60 joined to the slider 50 in a lateral direction from the track member 40 is reduced in comparison with that in the embodiment shown in FIGS. 1A-7. Therefore, if the dimensions of the outer profile of the machine tool 10 are relatively small as seen in the lateral direction of the track member 40, the configuration of the above modification may be advantageous. Further, the above modification is advantageous to reduce the overall footprint of the robot system.

On the other hand, in the above modification, the operation range of the robot 20 is widened beneath the track member 40, interference between the robot 20 and other equipments may easily occur. Further, in a case where a single robot 20 operates to transfer a workpiece 1 relative to a plurality of machine tools 10a, 10b, it is required to dispose the track member 40 at a higher location, so as to permit the movable arm mechanism 60 to pass above the machine tools 10a, 10b. Therefore, if a space for installing the robot system is restricted in a vertical direction in accordance with, e.g., the dimensions of the outer profile of the machine tool 10 or the configuration of a facility in which the robot system is installed, the configuration in which the slider 50 travels along the lateral face 44 of the track member 40 may be advantageous. For example, in the configuration of the embodiment of FIGS. 1A-7, it is possible to install the robot system even in a facility with a low ceiling.

Thus, it is possible to suitably select advantageous one from the configuration in which the slider 50 travels along the lateral face 44 of the track member 40 and the configuration in which the slider 50 travels along the bottom face 45 of the track member 40, in accordance with the intended purpose of the robot system.

While the invention has been described with reference to specific preferred embodiments, it will be understood, by those skilled in the art, that various changes and modifications may be made thereto without departing from the scope of the following claims.

The invention claimed is:

1. A workpiece transfer robot system comprising:
   a machine tool provided with a workpiece support section; and
   a robot capable of transferring a workpiece relative to said workpiece support section of said machine tool;
   said machine tool comprising a cover surrounding at least said workpiece support section, said cover including a first side wall provided with a first opening usable for a workpiece transferring task of said robot;
   said robot comprising:
      a track member defining a traveling axis extending in a direction perpendicular to said first side wall of said cover of said machine tool;
      a slider attached to said track member and capable of traveling along said traveling axis;
      a first arm attached to said slider and capable of swinging about a first swing axis;
      a second arm attached to said first arm and capable of swinging about a second swing axis parallel to said first swing axis; and
      a workpiece hold section provided on said second arm and capable of accessing said workpiece support section through said first opening of said cover of said machine tool,
   wherein said traveling axis obliquely intersects with said first swing axis;
   wherein said traveling axis and said first swing axis are arranged in a virtual plane extending horizontally to a floor face on which said robot is installed; and
   wherein said first arm extends obliquely relative to said track member.

2. The workpiece transfer robot system according to claim 1, further comprising a drive motor for driving said slider, wherein said slider is provided with an arm mount surface extending in a direction obliquely intersecting with respect to said traveling axis, said first arm being attached to said arm mount surface; and wherein said drive motor is placed on said slider behind said arm mount surface.

3. The workpiece transfer robot system according to claim 1, wherein said track member is provided on a lateral face thereof with a rail for guiding said slider along said traveling axis, said lateral face facing away from the floor face on which said robot is installed.

4. The workpiece transfer robot system according to claim 1, wherein said track member is provided on a bottom face thereof with a rail for guiding said slider along said traveling axis, said bottom face facing the floor face on which said robot is installed.

5. The workpiece transfer robot system according to claim 1, wherein said second arm includes a first base joined to said first arm in a manner capable of swinging about said second swing axis and a shaft portion joined to said first base in a manner capable of rotating about a third rotation axis orthogonal to said second swing axis, said shaft portion extending along said third rotation axis; and wherein said workpiece hold section includes a second base joined to said shaft portion in a manner capable of swinging about a fourth swing axis orthogonal to said third rotation axis and a distal portion joined to said second base in a manner capable of rotating about a fifth rotation axis orthogonal to said fourth swing axis, said distal portion capable of holding a workpiece.

6. The workpiece transfer robot system according to claim 1, comprising a plurality of machine tools, each of which is said machine tool, arranged side-by-side along an extending direction of said track member.

7. The workpiece transfer robot system according to claim 1, wherein said cover of said machine tool further includes a second side wall different from said first side wall and provided with a second opening separated from said first opening.

8. The workpiece transfer robot system according to claim 7, comprising a plurality of machine tools, each of which is said machine tool, arranged side-by-side along an extending direction of said track member, wherein said second side wall of any one of said machine tools is arranged at a same side as said second side wall of another one of said machine tools.

* * * * *